United States Patent
Subramanian et al.

(10) Patent No.: US 9,959,056 B2
(45) Date of Patent: May 1, 2018

(54) METHODS AND SYSTEMS FOR EFFICIENTLY STORING DATA AT A PLURALITY OF STORAGE TIERS USING A TRANSFER DATA STRUCTURE

(71) Applicant: NETAPP, INC., Sunnyvale, CA (US)

(72) Inventors: Ananthan Subramanian, San Ramon, CA (US); Cheryl Marie Thompson, Sunnyvale, CA (US); Sunitha Sunil Sankar, Cupertino, CA (US)

(73) Assignee: NETAPP, INC., Sunnyvale, CA (US)

( * ) Notice: Subject to any disclaimer, the term of this patent is extended or adjusted under 35 U.S.C. 154(b) by 0 days. days.

(21) Appl. No.: 14/994,971

(22) Filed: Jan. 13, 2016

(65) Prior Publication Data

US 2017/0199678 A1 Jul. 13, 2017

(51) Int. Cl.
*G06F 3/06* (2006.01)
*G06F 12/0804* (2016.01)

(52) U.S. Cl.
CPC .......... *G06F 3/0611* (2013.01); *G06F 3/0647* (2013.01); *G06F 3/0685* (2013.01); *G06F 12/0804* (2013.01); *G06F 2212/1024* (2013.01); *G06F 2212/1032* (2013.01); *G06F 2212/608* (2013.01)

(58) Field of Classification Search
CPC .... G06F 3/0611; G06F 3/0647; G06F 3/0685; G06F 12/0804; G06F 2212/1024; G06F 2212/1032; G06F 2212/608
USPC ...................................................... 711/143
See application file for complete search history.

(56) References Cited

U.S. PATENT DOCUMENTS

| | | | |
|---|---|---|---|
| 9,558,073 B2 * | 1/2017 | Cantwell | G06F 11/1451 |
| 9,575,974 B2 * | 2/2017 | Muthyala | G06F 17/30076 |
| 9,612,768 B2 * | 4/2017 | Katiyar | G06F 3/0647 |
| 9,613,046 B1 * | 4/2017 | Xu | G06F 17/30174 |
| 2003/0115439 A1 | 6/2003 | Mahalingam et al. | |
| 2010/0281230 A1 | 11/2010 | Rabii et al. | |
| 2012/0317337 A1 | 12/2012 | Johar et al. | |
| 2012/0330903 A1 * | 12/2012 | Periyagaram | G06F 3/0608 707/692 |

(Continued)

OTHER PUBLICATIONS

Non-Final Office Action on co-pending U.S. Appl. No. 14/994,924 dated Jun. 28, 2017.

(Continued)

*Primary Examiner* — Ramon A. Mercado
(74) *Attorney, Agent, or Firm* — Klein, O'Neill & Singh, LLP

(57) ABSTRACT

Methods and systems for a networked system are provided. One method includes receiving a request by a processor to transfer a data block stored at a first storage tier to the second storage tier; using an object staging data structure to determine that an object is available for transferring the data block from the first storage tier to the second storage tier. The object staging data structure an indicator providing a status for the object and an object length and an offset value of a transfer log indicating where information regarding the data block is stored. The method further includes updating an address of the storage tier where the information regarding data block is stored at the transfer log; increasing the object length and the offset value at the object staging data structure; and creating the object at the second tier.

20 Claims, 14 Drawing Sheets

(56) References Cited

U.S. PATENT DOCUMENTS

2013/0297872 A1   11/2013   Hyde, II et al.
2014/0164694 A1   6/2014   Storer
2017/0031772 A1*   2/2017   Subramanian ...... G06F 11/1451
2017/0031940 A1*   2/2017   Subramanian .... G06F 17/30091
2017/0068472 A1*   3/2017   Periyagaram ......... G06F 3/0619

OTHER PUBLICATIONS

Notice of Allowance on co-pending U.S. Appl. No. 14/994,924 dated Sep. 11, 2017.
Non-Final Office Action on co-pending U.S. Appl. No. 15/814,013 dated Feb. 7, 2018.

\* cited by examiner

| BIN# | OBJID | SLOT |
|---|---|---|
| 520A | 520B | 520C |

PVBN 520 for Capacity Tier 128

| BIN# 3 Bits | RAID 4K Block Number |
|---|---|
| 519A | 519B |

PVBN 519 for Performance Tier 112

FIG. 5B

METHODS AND SYSTEMS FOR EFFICIENTLY STORING DATA AT A PLURALITY OF STORAGE TIERS USING A TRANSFER DATA STRUCTURE

TECHNICAL FIELD

The present disclosure relates to networked storage environments, and more particularly, to efficiently use storage capacity.

BACKGROUND

Various forms of storage systems are used today. These forms include direct attached storage, network attached storage (NAS) systems, storage area networks (SANs), and others. Storage systems are commonly used for a variety of purposes, such as providing multiple users with access to shared data, backing up data and others.

A storage system typically includes at least one computing system (may also be referred to as a "server" or "storage server") executing a storage operating system configured to store and retrieve data on behalf of one or more client computing systems at one or more storage devices. The storage operating system exports data stored at storage devices as a storage volume. A storage volume is a logical data set which is an abstraction of physical storage, combining one or more physical mass storage devices or parts thereof into a single logical storage object. From the perspective of a client computing system each storage volume can appear to be a single storage device. However, each storage volume can represent storage space in one storage device, an aggregate of some or all of the storage space in multiple storage devices. Continuous efforts are being made to better manage storage devices and efficiently provide access to stored data.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures:

FIG. 5B shows the structure of physical volume block numbers for a performance tier storage and a capacity tier storage, used according to one aspect of the present disclosure;

DETAILED DESCRIPTION

Figure 1:
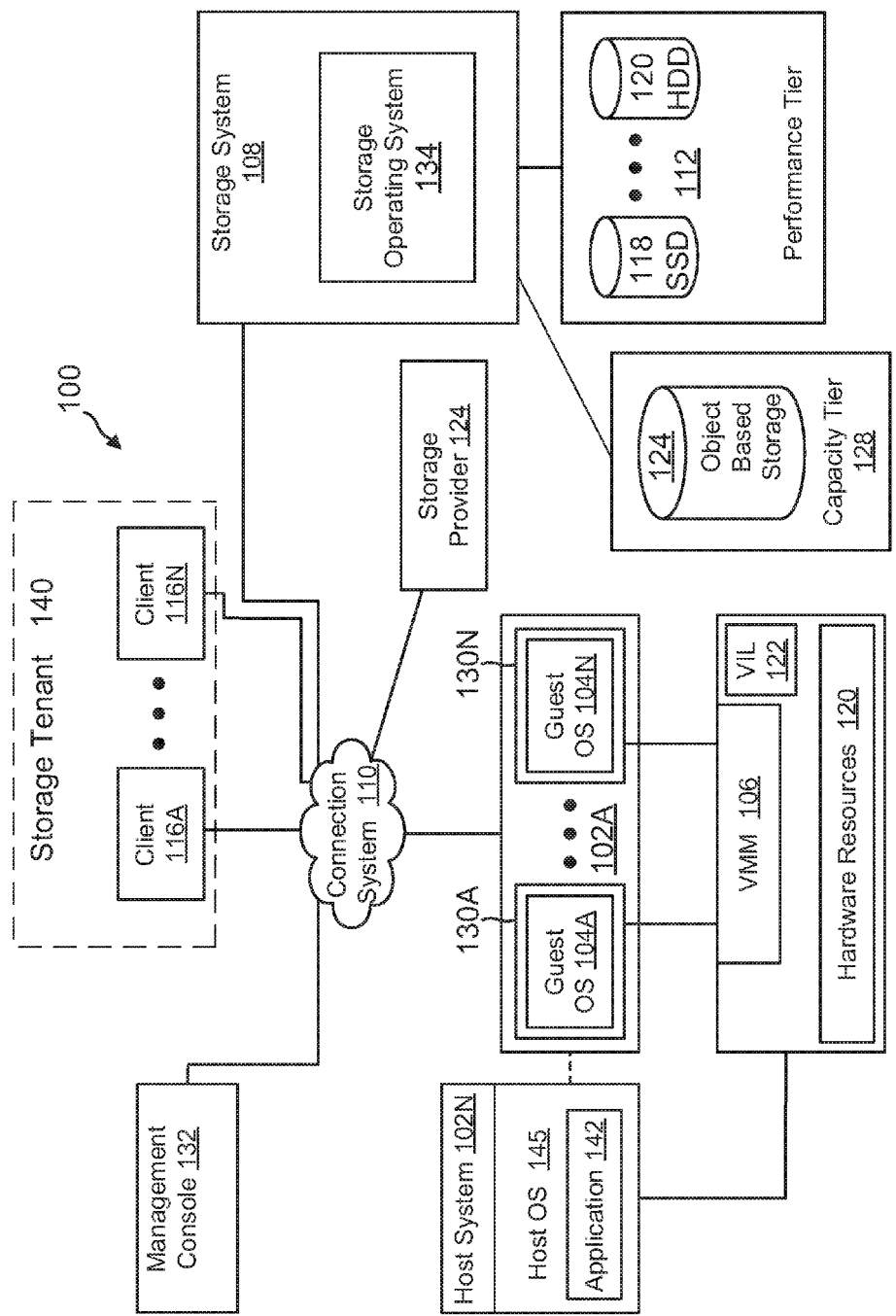
FIG. 1 shows an example of an operating environment for the various aspects disclosed herein.

As a preliminary note, the terms "component", "module", "system," and the like as used herein are intended to refer to a computer-related entity, either software-executing general purpose processor, hardware, firmware and a combination thereof. For example, a component may be, but is not limited to being, a process running on a hardware processor, a hardware processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

In one aspect of the present disclosure a transfer data structure (referred to as a transfer log) is provided. When data has to be moved from a performance tier to a capacity tier, the data is first buffered using the TLOG. This enables storage operating system consistency for a data tiering process and also avoids updating block pointers when data is moved, as described below in detail.

In one aspect, the TLOG is a data structure used for holding information about the data that is to be written to a capacity tier. An object is generated to move the data. A staging metafile tracks while the object is being built. If a request is received to read data while the object is still being built, then the TLOG is used to retrieve the data as described below in detail.

In one aspect, methods and systems for a networked system are provided. One method includes receiving a request by a processor to transfer a data block stored at a first storage tier to the second storage tier; using an object staging data structure to determine that an object is available for transferring the data block from the first storage tier to the second storage tier. The object staging data structure includes an indicator providing a status for the object, an object length and an offset value of a transfer log indicating where information regarding the data block is stored. The method further includes updating an address of the storage tier where the information regarding the data block is stored at the transfer log; increasing the object length and the offset value at the object staging data structure; and creating the object at the second tier.

System 100: FIG. 1 shows an example of a networked storage environment 100 (also referred to as system 100), for implementing the various adaptive aspect of the present disclosure. System 100 may include a plurality of computing devices 102A-102N (may also be referred to individually as a host platform/system 102 or simply as server 102) communicably coupled to a storage system (or storage server) 108 that executes a storage operating system 134 via a connection system 110 such as a local area network (LAN), wide area network (WAN), the Internet and others. As described herein, the term "communicably coupled" may refer to a direct connection, a network connection, or other connections to enable communication between devices.

As an example, host system 102A may execute a plurality of virtual machines (VMs) in a virtual environment that is described below in detail. Host 102N may execute one or more application 142, for example, a database application (for example, Oracle application), an email application (Microsoft Exchange) and others that use the storage system 108 to store information. Host 102N also executes an operating system 145, for example, a Windows based operating system, Linux, Unix and others (without any derogation of any third party trademark rights).

Clients 116A-116N (may be referred to as client (or user) 116) are computing devices that can access storage space at the storage system 108. A client can be the entire system of a company, a department, a project unit or any other entity. Each client is uniquely identified and optionally, may be a part of a logical structure called a storage tenant 140. The storage tenant 140 represents a set of users (may be referred to as storage consumers) for a storage provider 124 (may also be referred to as a cloud manager, where cloud computing is being utilized). Where a storage provider 124 is being used, the client accesses storage through the storage provider. It is noteworthy that the adaptive aspects of the present disclosure are not limited to using a storage provider or a storage tenant and may be implemented for direct client access.

In one aspect, storage system 108 has access to a first set of mass storage devices 118-120 within at least one storage subsystem 112 that is referred to as a performance tier, a hybrid storage device system. The mass storage devices 118 may include solid state drives (SSDs), while the mass storage devices 120 may include writable storage device media such as hard disk drives (HDD), magnetic disks, video tape, optical, DVD, magnetic tape, and any other similar media adapted to store information. The storage devices 118-120 may be organized as one or more groups of Redundant Array of Independent (or Inexpensive) Disks (RAID). The various aspects disclosed are not limited to any particular storage device type or storage device configuration.

The storage system also has access to an object based storage 124 at a capacity tier 128. The term object as defined herein means a chunk of data written together in an object tier. The object based storage 124 may be slower than the performance tier 112 storage. In one aspect, data stored at the object store 124 is managed using an object identifier and an offset value within the object, as described below in detail. The capacity tier 128 may be used in a cloud based environment. The adaptive aspects described herein are not limited to the cloud based environment.

As an example, the storage system 108 may provide a set of logical storage volumes (or logical unit numbers (LUNs)) that presents storage space to clients and VMs for storing information. Each volume may be configured to store data files (or data containers or data objects), scripts, word processing documents, executable programs, and any other type of structured or unstructured data. From the perspective of one of the client systems, each volume can appear to be a single drive. However, each volume can represent storage space at one storage device, an aggregate of some or all of the storage space in multiple storage devices, a RAID group, or any other suitable set of storage space.

The storage operating system 134 organizes storage space at the performance tier 112 as one or more "aggregate", where each aggregate is identified by a unique identifier and a location. Within each aggregate, one or more storage volumes are created whose size can be varied. A qtree, sub-volume unit may also be created within the storage volumes. As a special case, a qtree may be an entire storage volume.

The storage system 108 may be used to store and manage information at storage devices in either the performance tier 112 or the capacity tier 128 based on a request. The request may be based on file-based access protocols, for example, the Common Internet File System (CIFS) protocol or Network File System (NFS) protocol, over TCP/IP. Alternatively, the request may use block-based access protocols, for example, iSCSI and SCSI encapsulated over Fibre Channel (FCP).

To facilitate access to storage space, the storage operating system 134 implements a file system that logically organizes stored information as a hierarchical structure for files/directories/objects at the storage devices. Each "on-disk" file may be implemented as set of blocks configured to store information, such as text, whereas a directory may be implemented as a specially formatted file in which other files and directories are stored. These data blocks are organized within a volume block number (VBN) space that is maintained by a file system of the storage operating system 134 described below in detail. The file system may also assign each data block in the file a corresponding "file offset" or file block number (FBN). The file system typically assigns sequences of FBNs on a per-file basis, whereas VBNs are assigned over a larger volume address space. The file system organizes the data blocks within the VBN space as a logical volume. The file system typically consists of a contiguous range of VBNs from zero to n, for a file system of size n−1 blocks.

An example of storage operating system 134 is the Data ONTAP™ storage operating system available from NetApp, Inc. that implements a Write Anywhere File Layout (WAFL) file system (without derogation of any trademark rights of NetApp Inc.). Of course, the various aspects disclosed herein are not limited to any specific file system type and maybe implemented by other file systems.

The storage operating system 134 may further implement a storage module (for example, a PAID system for performance tier 112 that manages the storage and retrieval of the information to and from storage devices in accordance with input/output (I/O) operations. When accessing a block of a file in response to servicing a client request, the file system specifies a VBN that is translated at the file system/RAID system boundary into a disk block number (DBN) location on a particular storage device (disk, DBN) within a RAID group of the physical volume. Each block in the VBN space and in the DBN space is typically fixed, e.g., 4 k bytes (kB), in size; accordingly, there is typically a one-to-one mapping between the information stored on the disks in the DBN space and the information organized by the file system in the VBN space.

A requested block is retrieved from a storage device and stored in a buffer cache of a memory of the storage system 108 as part of a buffer tree of the file. The buffer tree is an internal representation of blocks for a file stored in the buffer cache and maintained by the file system. Broadly stated and as described below in detail, the buffer tree has an inode at the root (top-level) of the file, as described below.

An inode is a data structure used to store information, such as metadata, about a file, whereas the data blocks are structures used to store the actual data for the file. The information in an inode may include, e.g., ownership of the file, access permission for the file, size of the file, file type and references to locations on disk of the data blocks for the file. The references to the locations of the file data are provided by pointers, which may further reference indirect blocks that, in turn, reference the data blocks, depending upon the quantity of data in the file. Each pointer may be embodied as a VBN to facilitate efficiency among the file system and the RAID system when accessing the data.

Volume information (volinfo) and file system information (fsinfo) blocks specify the layout of information in the file system, the latter block including an inode of a file that includes all other inodes of the file system (the inode file). Each logical volume (file system) has an fsinfo block that is preferably stored at a fixed location within, e.g., a RAID group. The inode of the fsinfo block may directly reference (point to) blocks of the inode file or may reference the indirect blocks of the inode file that, in turn, reference direct blocks of the inode file. Within each direct block of the inode file are embedded inodes, each of which may reference indirect blocks that, in turn, reference data blocks (also shown as L0 blocks) of a file. An example of an inode and a buffer tree are provided below.

In a typical mode of operation, a client transmits one or more input/output (I/O) commands, such as a CFS or NFS request, over connection system 110 to the storage system 108. Storage system 108 receives the request, issues one or more I/O commands to storage devices to read or write the data on behalf of the client system, and issues a CIFS or NFS response containing the requested data over the network 110 to the respective client system.

As an example, system 100 may also include a virtual machine environment where a physical resource is time-shared among a plurality of independently operating processor executable virtual machines (VMs). Each VM may function as a self-contained platform, running its own operating system (OS) and computer executable, application software. The computer executable instructions running in a VM may be collectively referred to herein as "guest software." In addition, resources available within the VM may be referred to herein as "guest resources."

The guest software expects to operate as if it were running on a dedicated computer rather than in a VM. That is, the guest software expects to control various events and have access to hardware resources on a physical computing system (may also be referred to as a host platform) which maybe referred to herein as "host hardware resources". The host hardware resource may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host platform.

Host platform 102A includes/provides a virtual machine environment executing a plurality of VMs 130A-130N that may be presented to client computing devices/systems 116A-116N. VMs 130A-130N execute a plurality of guest OS 104A-104N (may also be referred to as guest OS 104) that share hardware resources 120. Application 142 may be executed within VMs 130. As described above, hardware resources 120 may include storage, CPU, memory, I/O devices or any other hardware resource.

In one aspect, host platform 102A interfaces with a virtual machine monitor (VMM) 106, for example, a processor executed Hyper-V layer provided by Microsoft Corporation of Redmond, Wash., a hypervisor layer provided by VMWare Inc., or any other type. VMM 106 presents and manages the plurality of guest OS 104A-104N executed by the host platform 102. The VMM 106 may include or interface with a virtualization layer (VIL) 122 that provides one or more virtualized hardware resource to each OS 104A-104N.

In one aspect, VMM 106 is executed by host platform 102A with VMs 130A-130N. In another aspect, VMM 106 may be executed by an independent stand-alone computing system, referred to as a hypervisor server or VMM server and VMs 130A-130N are presented at one or more computing systems.

It is noteworthy that different vendors provide different virtualization environments, for example, VMware Corporation, Microsoft Corporation and others. Data centers may have hybrid virtualization environments/technologies, for example, Hyper-V and hypervisor based virtual environment. The generic virtualization environment described above with respect to FIG. 1 may be customized depending on the virtual environment to implement the aspects of the present disclosure. Furthermore, VMM 106 (or VIL 122) may execute other modules, for example, a storage driver, network interface and others, the details of which are not germane to the aspects described herein and hence have not been described in detail. The virtualization environment may use different hardware and software components and it is desirable for one to know an optimum/compatible configuration.

In one aspect, system 100 provides a management console 132 for configuring and managing the various components of system 100. As an example, the management console may be implemented as or include one or more application programming interface (API). The APIs may be implemented as REST APIs, where REST means "Representational State Transfer". REST is a scalable system used for building web services. REST systems/interface may use HTTP (hyper-text transfer protocol) or other protocols for communicating.

Although storage system 108 is shown as a stand-alone system, i.e. a non-cluster based system, in another aspect, storage system 108 may have a distributed architecture; for example, a cluster based system that is described below in detail with respect to FIG. 2A.

Clustered System: Before describing the various aspects of the present disclosure, the following describes a clustered networked storage environment 200. FIG. 2A shows a cluster based storage environment 200 having a plurality of nodes operating as resources to store data on behalf of clients at either the performance tier or the capacity tier.

Storage environment 200 may include a plurality of client systems 204.1-204.N as part of or associated with storage tenant 140, a clustered storage system 202 (similar to storage system 108) and at least a network 206 communicably connecting the client systems 204.1-204.N, the management console 132, the storage (or cloud) provider 124 and the clustered storage system 202. It is noteworthy that these components may interface with each other using more than one network having more than one network device.

The clustered storage system 202 includes a plurality of nodes 208.1-208.3, a cluster switching fabric 210, and a plurality of mass storage devices in the performance tier 112.1-112.3 (similar to performance tier 112). The nodes may also store data at capacity tier 128, as described below in detail.

Each of the plurality of nodes 208.1-208.3 is configured to include a network module, a storage module, and a management module, each of which can be implemented as a processor executable module. Specifically, node 208.1 includes a network module 214.1, a storage module 216.1, and a management module 218.1, node 208.2 includes a network module 214.2, a storage module 216.2, and a management module 218.2, and node 208.3 includes a network module 214.3, a storage module 216.3, and a management module 218.3.

The network modules 214.1-214.3 include functionality that enable the respective nodes 208.1-208.3 to connect to one or more of the client systems 204.1-204.N (or the management console 132) over the computer network 206. The network modules handle file network protocol processing (for example, CFS, NFS and/or iSCSI requests). The storage modules 216.1-216.3 connect to one or more of the storage devices at the performance tier and/or the capacity tier and process I/O requests. Accordingly, each of the plurality of nodes 208.1-208.3 in the clustered storage server arrangement provides the functionality of a storage server.

The management modules 218.1-218.3 provide management functions for the clustered storage system 202. The management modules 218.1-218.3 collect storage information regarding storage devices.

A switched virtualization layer including a plurality of virtual interfaces (VIFs) 219 is provided to interface between the respective network modules 214.1-214.3 and the client systems 204.1-204.N, allowing storage space at the storage devices associated with the nodes 208.1-208.3 to be presented to the client systems 204.1-204.N as a single shared storage pool.

The clustered storage system 202 can be organized into any suitable number of storage virtual machines (SVMs) (may be referred to as virtual servers (may also be referred to as "SVMs"), in which each SVM represents a single storage system namespace with separate network access. A SVM may be designated as a resource on system 200. Each SVM has a client domain and a security domain that are separate from the client and security domains of other SVMs. Moreover, each SVM is associated with one or more VIFs 219 and can span one or more physical nodes, each of which can hold one or more VIFs and storage associated with one or more SVMs. Client systems can access the data on a SVM from any node of the clustered system, through the VIFs associated with that SVM.

Each of the nodes 208.1-208.3 is defined as a computing system to provide application services to one or more of the client systems 204.1-204.N. The nodes 208.1-208.3 are interconnected by the switching fabric 210, which, for example, may be embodied as a Gigabit Ethernet switch or any other type of switching/connecting device.

Figure 2A:
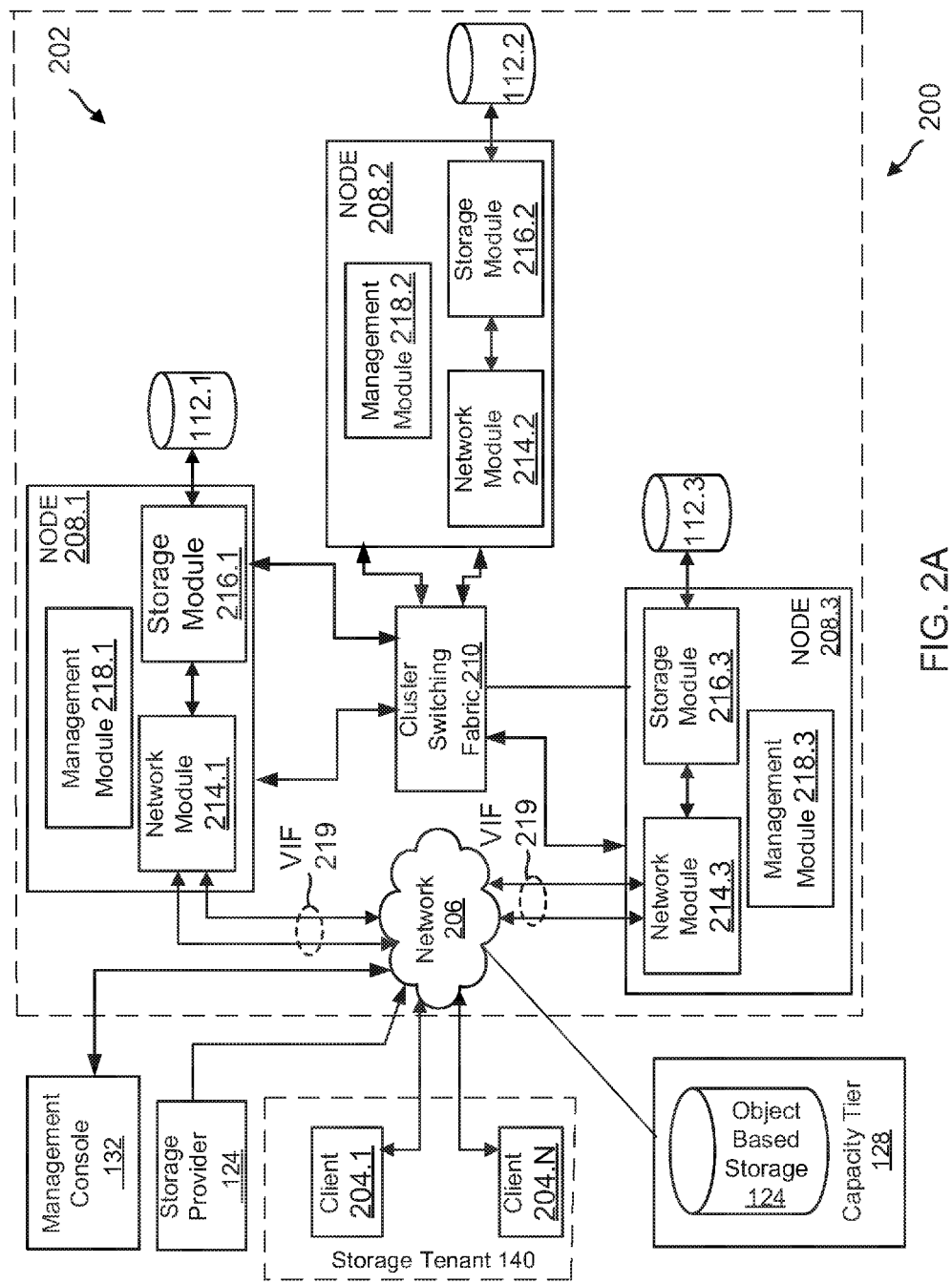
FIG. 2A shows an example of a clustered storage system, used according to one aspect of the present disclosure.

Although FIG. 2A depicts an equal number (i.e., 3) of the network modules 214.1-214.3, the storage modules 216.1-216.3, and the management modules 218.1-218.3, any other suitable number of network modules, storage modules, and management modules may be provided. There may also be different numbers of network modules, storage modules, and/or management modules within the clustered storage system 202. For example, in alternative aspects, the clustered storage system 202 may include a plurality of network modules and a plurality of storage modules interconnected in a configuration that does not reflect a one-to-one correspondence between the network modules and storage modules. In another aspect, the clustered storage system 202 may only include one network module and storage module.

Each client system 204.1-204.N may request the services of one of the respective nodes 208.1, 208.2, 208.3, and that node may return the results of the services requested by the client system by exchanging packets over the computer network 206, which may be wire-based, optical fiber, wireless, or any other suitable combination thereof.

Figure 2B:
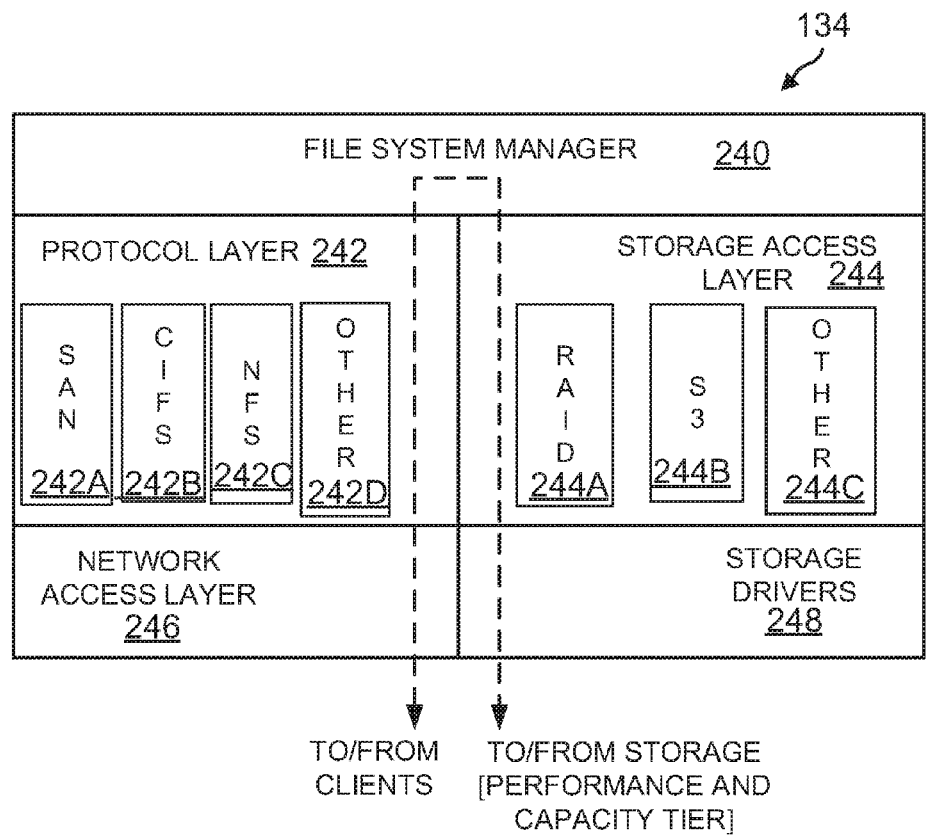
FIG. 2B shows an example of a storage operating system, used according to one aspect of the present disclosure.

Storage Operating System: FIG. 2B illustrates a generic example of storage operating system 134 (FIG. 1) executed by node 208.1, according to one aspect of the present disclosure. In one example, storage operating system 134 may include several modules, or "layers" executed by one or both of network module 214 and storage module 216. These layers include a file system manager 240 that keeps track of a hierarchical structure of the data stored in storage devices and manages read/write operation, i.e. executes read/write operation on storage in response to client 204.1/204.N requests, as described below in detail.

Storage operating system 134 may also include a protocol layer 242 and an associated network access layer 246, to allow node 208.1 to communicate over a network with other systems, such as clients 204.1/204.N. Protocol layer 242 may implement one or more of various higher-level network protocols, such as SAN (e.g. iSCSI) (242A), CIFS (242B), NFS (242C), Hypertext Transfer Protocol (HTTP) (not shown), TCP/IP (not shown) and others (242D).

Network access layer 246 may include one or more drivers, which implement one or more lower-level protocols to communicate over the network, such as Ethernet. Interactions between clients' and mass storage devices are illustrated schematically as a path, which illustrates the flow of data through storage operating system 134.

The storage operating system 134 may also include a storage access layer 244 and an associated storage driver layer 248 to allow storage module 216 to communicate with a storage device. The storage access layer 244 may implement a higher-level storage protocol, such as RAID (redundant array of inexpensive disks) (244A), a S3 layer 244B to access the capacity tier described below in detail, and other layers 244C. The storage driver layer 248 may implement a lower-level storage device access protocol, such as FC or SCSI. The storage driver layer 248 may maintain various data structures (not shown) for storing information regarding storage volume, aggregate and various storage devices.

As used herein, the term "storage operating system" generally refers to the computer-executable code operable on a computer to perform a storage function that manages data access and may, in the case of a node 208.1, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the disclosure described herein may apply to any type of special-purpose (e.g., file server, filer or storage serving appliance) or general-purpose computer, including a stand-alone computer or portion thereof, embodied as or including a storage system. Moreover, the teachings of this disclosure can be adapted to a variety of storage system architectures including, but not limited to, a network-attached storage environment, a storage area network and a storage device directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present disclosure may be utilized with any suitable file system, including a write in place file system.

Figure 3:
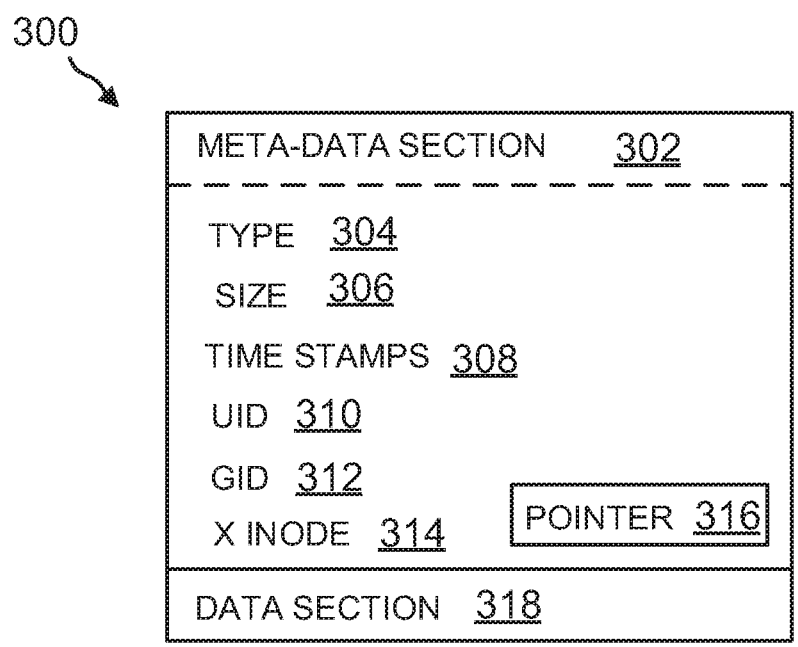
FIG. 3 shows an example of an inode, used according to one aspect of the present disclosure.

Inode Structure: FIG. 3 shows an example of an inode structure 300 (may also be referred to as inode 300) used according to one aspect of the present disclosure. Inode 300 may include a meta-data section 302 and a data section 318. The information stored in the meta-data section 302 of each inode 300 describes a file and, as such, may include the file type (e.g., regular, directory or object) 304, size 306 of the file, time stamps (e.g., access and/or modification) 308 for the file and ownership, i.e., user identifier (UID 310) and group ID (GID 312), of the file. The metadata section 302 may also include a X-inode field 314 with a pointer 316 that references another on-disk inode structure containing, e.g., access control list (ACL) information associated with the file or directory.

The contents of data section 318 of each inode 300 may be interpreted differently depending upon the type of file (inode) defined within the type field 304. For example, the data section 318 of a directory inode structure includes meta-data controlled by the file system, whereas the data section of a "regular inode" structure includes user-defined data. In this latter case, the data section 318 includes a representation of the data associated with the file. Data section 318 of a regular on-disk inode file may include user data or pointers, the latter referencing, for example, 4 KB data blocks for storing user data at a storage device.

Inode structure 300 may have a restricted size (for example, 122 bytes). Therefore, user data having a size that is less than or equal to 64 bytes may be represented, in its entirety, within the data section of an inode. However, if the user data is greater than 64 bytes but less than or equal to, for example, 64 kilobytes (KB), then the data section of the inode comprises up to 16 pointers, each of which references a 4 KB block of data stored at a disk. Moreover, if the size of the data is greater than 64 kilobytes but less than or equal to 64 megabytes (MB), then each pointer in the data section 318 of the inode references an indirect inode that contains 1024 pointers, each of which references a 4 KB data block on disk.

Figure 4:
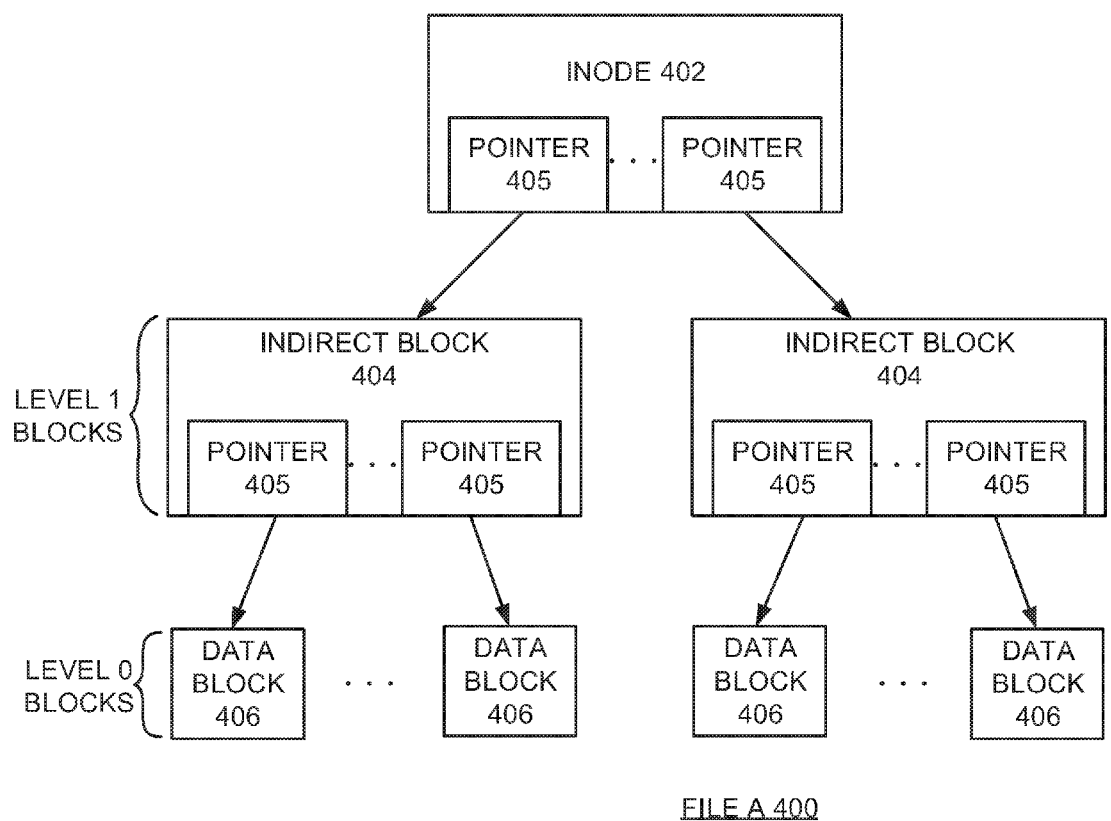
FIG. 4 shows an example of a buffer tree, used according to one aspect of the present disclosure.

Buffer Tree: FIG. 4 is an example of an inode buffer tree of a data container that may be used by the storage operating system 134. The buffer tree is an internal representation of blocks for a data container (e.g., file A 400) loaded into a buffer cache and maintained by the file system 240. A root (top-level) inode 402, such as an embedded inode, references indirect (e.g., Level 1) blocks 404. The indirect blocks (and inode) contain pointers 405 that ultimately reference data blocks 406 used to store the actual data of file A. That is, the data of file A 400 are contained in data blocks and the locations of these blocks are stored in the indirect blocks of the file. Each Level 1 indirect block 404 may contain pointers to many data blocks. According to the "write anywhere" nature of the file system, these blocks may be located anywhere at the storage devices.

In one aspect, the file system 240 allocates blocks, and frees blocks, to and from a virtual volume (may be referred to as VVOL) of an aggregate. The aggregate, as mentioned above, is a physical volume comprising one or more groups of storage devices, such as PAID groups, underlying one or more VVOLs of the storage system. The aggregate has its own physical volume block number (PVBN) space and maintains metadata, such as block allocation bitmap structures, within that PVBN space. Each VVOL also has its own virtual volume block number (VVBN) space and maintains metadata, such as block allocation bitmap structures, within that VVBN space. Typically, PVBNs are used as block pointers within buffer trees of files (such as file 400) stored in a VVOL.

As an example, a VVOL may be embodied as a container file in an aggregate having L0 (data) blocks that comprise all blocks used to hold data in a VVOL; that is, the L0 data blocks of the container file contain all blocks used by a VVOL. L1 (and higher) indirect blocks of the container file reside in the aggregate and, as such, are considered aggregate blocks. The container file is an internal (to the aggregate) feature that supports a VVOL; illustratively, there is one container file per VVOL. The container file is a hidden file (not accessible to a user) in the aggregate that holds every block in use by the VVOL.

When operating in a VVOL, VVBN identifies a FBN location within the file and the file system uses the indirect blocks of the hidden container file to translate the FBN into a PVBN location within the physical volume, which block can then be retrieved from disk.

Figure 5A:
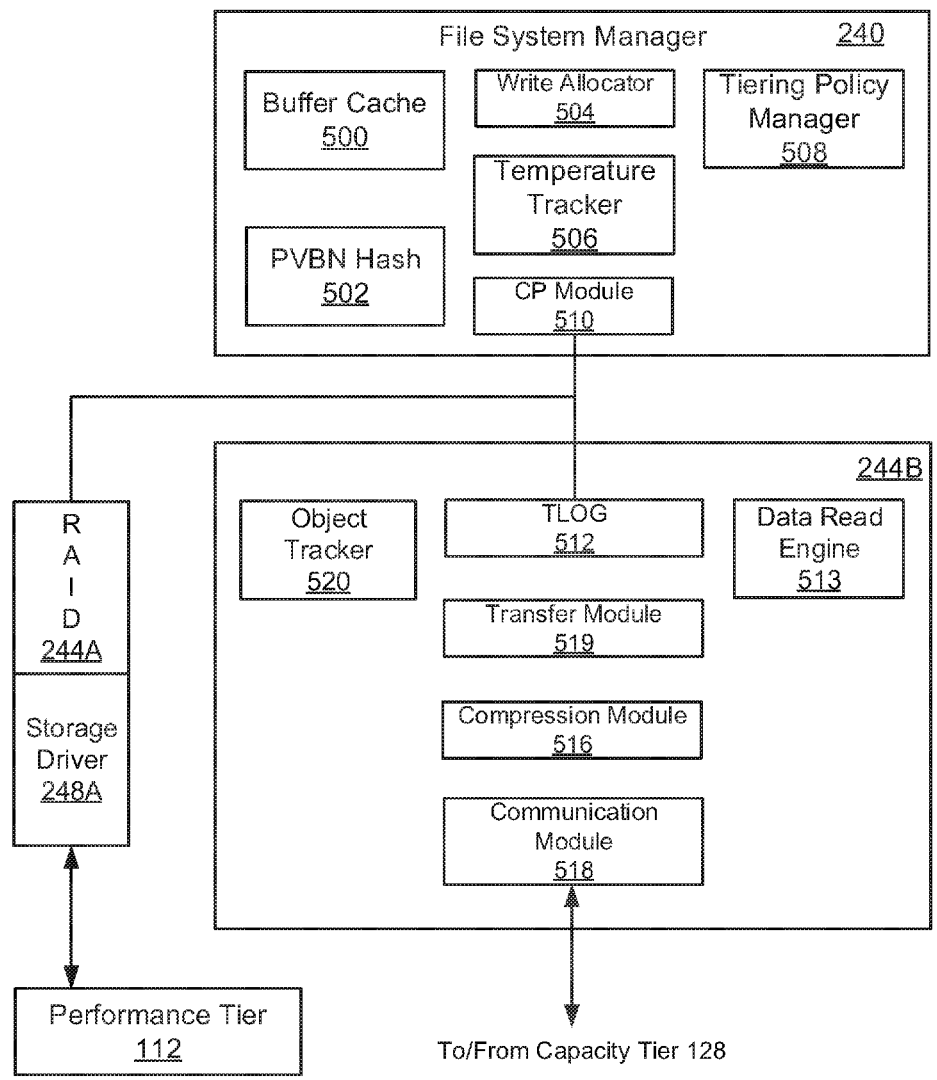
FIG. 5A shows a block diagram with details of a file system manager, according to one aspect of the present disclosure.

File System Manager 240/TLOG 512: FIG. 5A shows an example of a block diagram of the file system manager 240, according to one aspect of the present disclosure. The file system manager 240 includes a write allocator 504 that allocates blocks for writing data. A buffer cache 500 is used to cache data. A PVBN hash module 502 is used to cache in-copies of blocks indexed by an aggregate identifier and a PVBN. The use of the PVBNs are described below in detail.

A temperature tracker module 506 of the file system 240 tracks the "temperature" of stored data. Hot data is data that is frequently accessed, based on a duration that is defined by the file system manager 240. Cold data is data that is not frequently accessed. The temperature tracker 506 interfaces with the read path to record read hits and determines read patterns. The temperature tracker 506 also interfaces with a tiering policy manager 508 that determines how stored data is tiered, i.e. stored at SSDs 118, HDD 120 or capacity tier 128. The tiering policy manager 508 may store tiering policies that may be used to ascertain where data is to be stored. This information is provided to the temperature tracker 506. The temperature tracker 506 hooks into the buffer cache 500 and PVBN hash 502 to determine which blocks get accessed and how often. Data stored at the performance tier 112 that is categorized as cold is transferred to the capacity tier 128, as described below in detail.

A consistency point (CP) module 510 is used to manage CP operations. In one aspect, when cold data is to be moved to the capacity tier, the data is marked as dirty. The CP module 510 then pushes the information regarding the dirty data into a TLOG metadata structure 512 (also referred to as TLOG 512) that is described below in detail. The data is moved to the capacity tier 128 via a transfer module 514 and a communication module 518.

The TLOG 512 enables data to be buffered while an object is still being created, as described below in detail. The TLOG 512 may also be used to service read requests for blocks that have not yet been moved to the capacity tier 128 but are in the process of being sent i.e. while an object is being built. Blocks associated with an object in the TLOG 512 are freed only after they have been safely stored and depending on capacity tier properties, verified that they have been stored successfully.

In one aspect, an object tracker 520 finds free usable capacity tier PVBNs efficiently. This is performed by using an object identifier map that tracks used and unused object IDs. The object tracker 520 also tracks reference counts of objects in the capacity tier 128 to ensure that the object is not freed until nothing in the object is needed or referenced.

The data read engine 513 is used fetch data from capacity tier 128 in response to read requests, as described below in detail. The compression module 516 manages compression/de-compression of data stored at the capacity tier.

The communication module 518 provides S3 APIs that are used to interface with capacity tier storage. The APIs may customized based on the storage vendor providing the capacity tier storage.

The RAID layer 244A using a storage driver 248A, for example, a Fibre Channel driver is used to access the performance tier.

PVBN Format: FIG. 5B shows a format of a capacity tier PVBN 520 and a RAID PVBN 519. The first few bits 520A (for example, 3 bits) of the capacity tier PVBN indicates that the PVBN is for a capacity tier. The object_ID (or object ID) 520B provides a unique object identifier, for example, as a 34-bit value to identify an object. A slot number 520C may be represented as a 10-bit value. The slot number 520C indicates the location of a block within an object. As an example, one object may include 1024, 4 KB blocks. The slot number indicates where a block is within that object having a plurality of blocks.

The RAID PVBN type is indicated by a bit value shown as 519A and the RAID block number is represented by 519B.

Figure 5C:
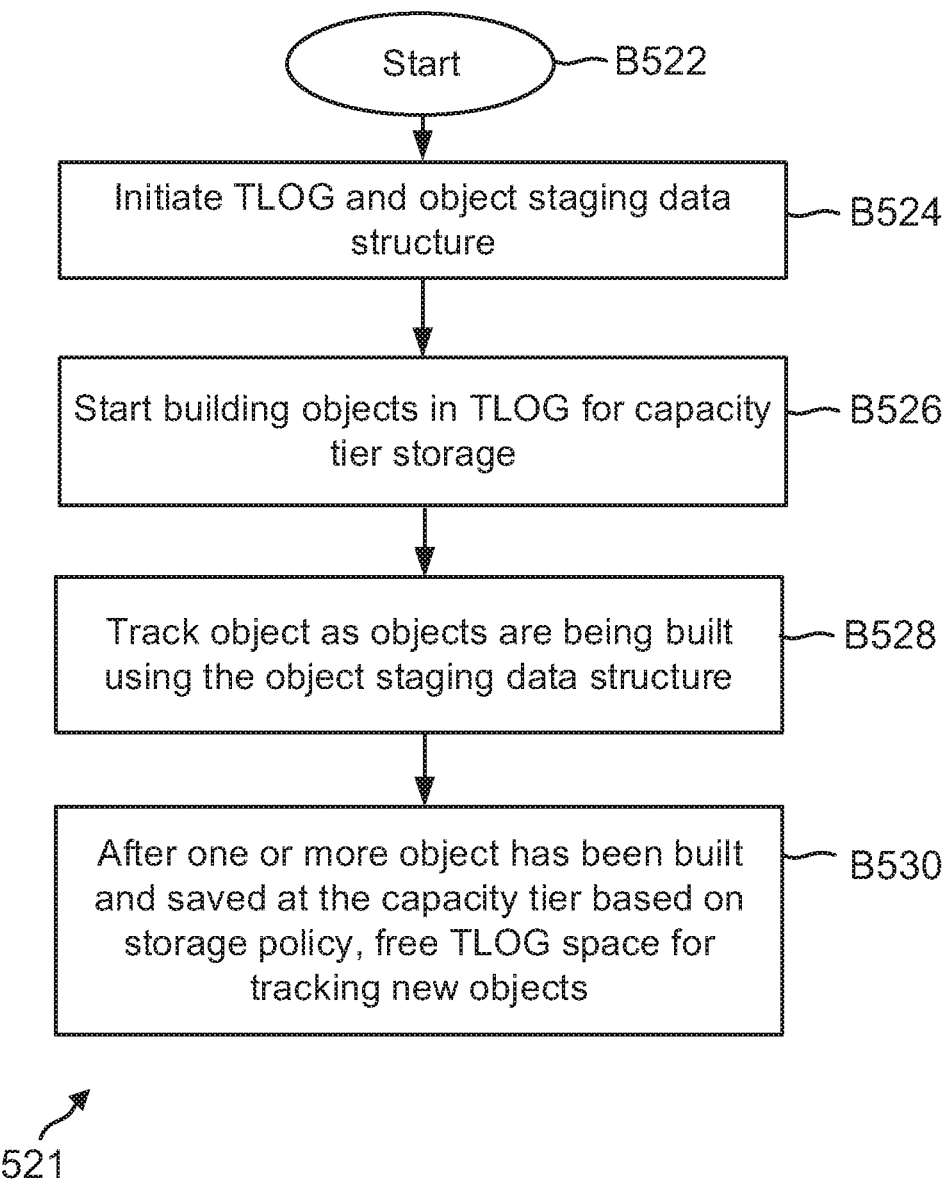
FIG. 5C shows a process for using a transfer data structure (TLOG), according to one aspect of the present disclosure.
Figure 5D:
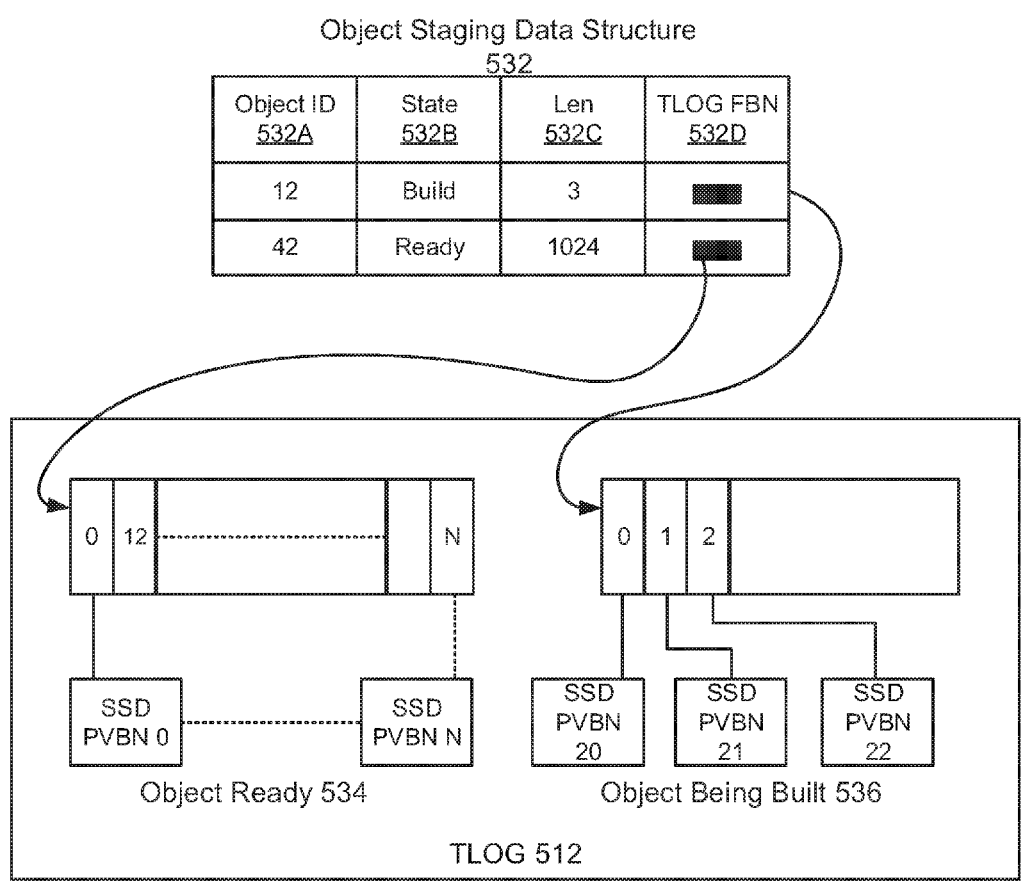
FIG. 5D shows an example of an object staging data structure and the transfer data structure, according to one aspect of the present disclosure.

Process Flow for Using TLOG 512: FIG. 5C shows a process 521 for building and tracking an object for the capacity tier 128 using an object staging data structure and the TLOG 512, according to one aspect of the present disclosure. The process begins in block B522. In block B524, the TLOG 512 and an object staging data structure 532, shown in FIG. 5D are initialized.

When data has to be written to the capacity tier 128, an object is built to include a plurality of data chunks/blocks, for example, 4 KB chunks of data in block B526. The object is tracked using the object staging data structure 532. After one or more objects have been built, the object with its data is transferred to the capacity tier 128 in block B530. The storage policy of the capacity tier 128 may dictate that the storage operation be verified, before freeing up the space used by the transferred object at TLOG.

Object Staging Data Structure: FIG. 5D shows an example of using the object staging structure 532 and the TLOG 512, according to one aspect of the present disclosure. The TLOG 512 shows that one object 534 is ready and object 536 is still in the process of being built. The already built and the in-process objects are tracked by the object staging structure 532 which stores the object ID in column 532A, the state of the object in column 532B (i.e. indicating of the object is being built or ready), the length of the object (i.e. the number of blocks that are already in the object) in column 532C and a TLOG FBN in column 532D. For example, object 12 is in the process of being built and has three blocks of data at FBN 0, 1, 2 (shown as 536). The object 42 is ready with 1024 blocks (shown as 534). The SSD PVBN is stored at the respective FBN of the TLOG indicating the PVBN of the performance tier where the actual data for a chunk resides.

In one aspect, an object ID map tracks the various object IDs that are in use. The write allocator 504 can track the object ID that is free and use that for new objects. An object reference count is used to track the slots in an object that may be used by the file system.

Figure 6A:
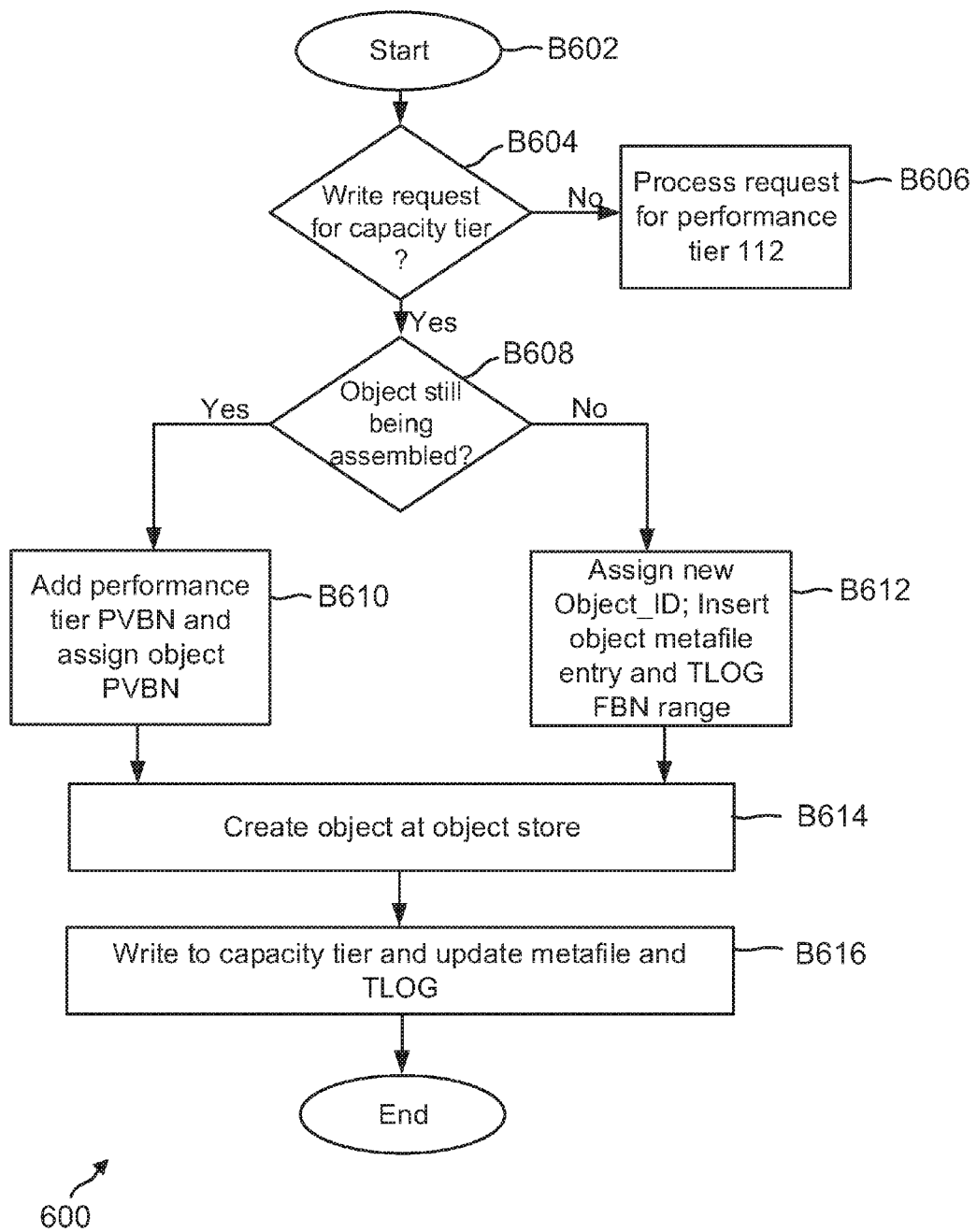
FIG. 6A shows a process for writing data using a TLOG, according to one aspect of the present disclosure.

Write Process Flow: FIG. 6A shows a process 600 for writing data to the capacity tier 128, according to one aspect of the present disclosure. The process begins in block B602. It is noteworthy that new data that is received by the storage system 108 may first be written to the performance tier 112 for efficiency reasons because the performance tier 112 storage has faster access than the capacity tier 128. A write request is first handled by the write allocator 504.

In block B604, the process determines if a write request is for the capacity tier 128. This may be determined based on if the request is from the CP module 510 to move data to the capacity tier 128. If the write request is for the performance tier 112, then in block B606, the data is written by the RAID layer 244A using storage driver 248A. The PVBN for RAID in this case are assigned by the RAID layer 244A.

When data is to be written at the capacity tier 128, then in block B608, the process first determines if an object is being currently built for the capacity tier 128. This is determined by scanning the object staging data structure 532. If yes, then in block B610, the performance tier PVBN is added to the TLOG 512 as shown in FIG. 5D and the object PVBN is assigned with a slot number. The object staging data structure 532 is then updated.

If an object is not being assembled, then a new object ID is assigned and added to the object staging data structure 532. The object ID is obtained from the object ID map. An object metafile entry is added and the TLOG FBN (532D, FIG. 5D) is inserted. Details of the object staging data structure are provided above with respect to FIG. 5D.

After one or more object is ready, i.e. enough data is available for an object at the object store 124, the object is generated by the transfer module 514. The transfer module 514 uses the object metafile and the TLOG 512 to create the object. The object metafile (or data structure) is shown as 648 in FIG. 6C and includes an object ID, a sequence number, a buffer ID of a container file (BTID), a state for the object and a reference count described below in detail. The data associated with the plurality of object chunks is then transferred to the capacity tier 128 in block B616 and the process ends.

Figure 6B:
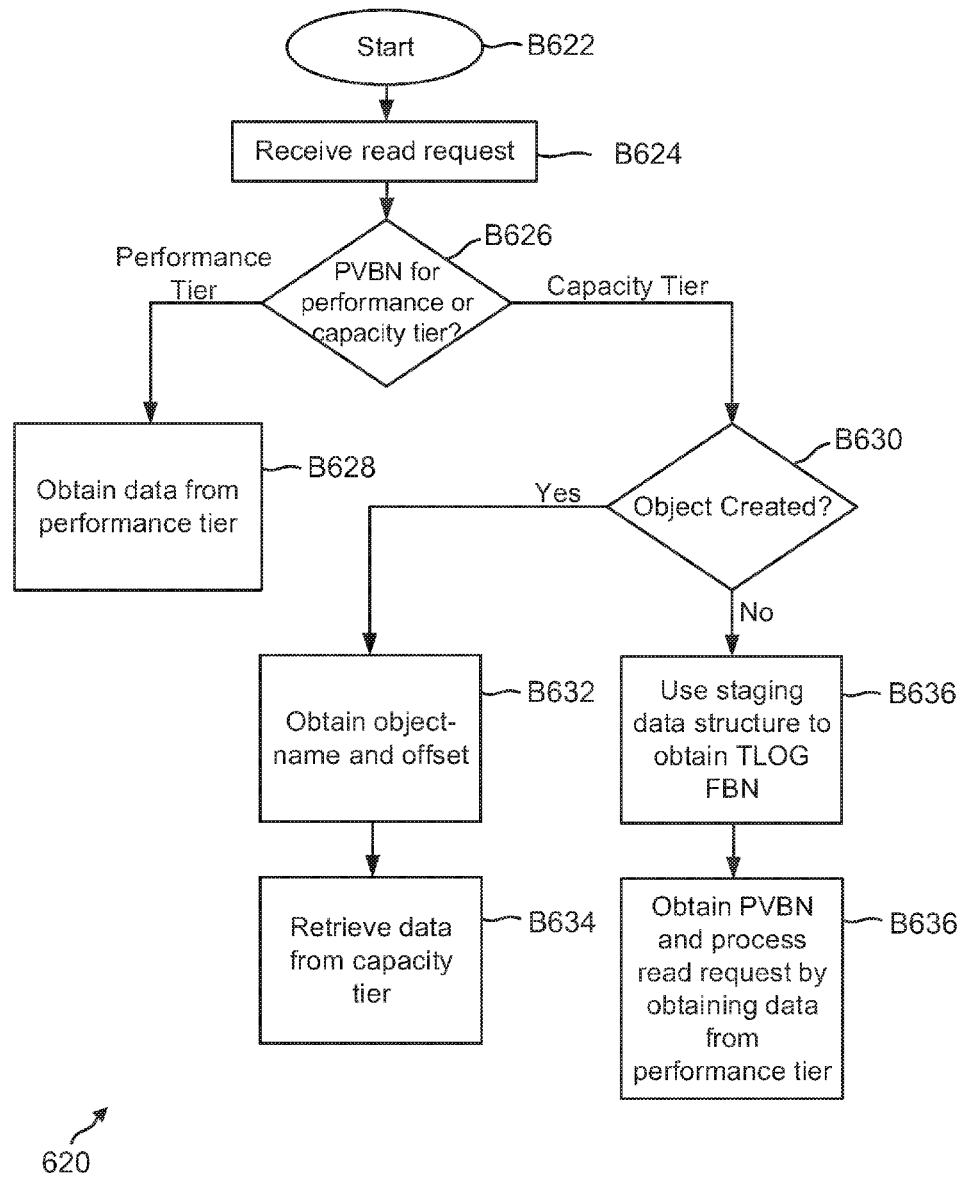
FIG. 6B shows a process for reading data, according to one aspect of the present disclosure.

Read Process Flow: FIG. 6B shows a process 620 for processing a read request, according to one aspect of the present disclosure. The process begins in block B622, when the storage system 108 is operational and functional. A read request is received in block B624. The process first determines if the request is for the performance tier or the capacity tier. This is determined by detecting the PVBN fields 520A and 519A, described above with respect to FIG. 5B. If the request is for the performance tier 112, then the RAID layer 244A is used to obtain the data from the performance tier 112.

If the request is for the capacity tier 128, then in block B630, the process first determines if an object associated with the requested data has been created and stored at the capacity tier 128. If yes, then the object name and offset is obtained from the object metafile and the data is retrieved from the object store 124.

When the object has not completely been created and/or the object has not been stored at the capacity tier 128 yet, then in block B636, the object staging data structure 532 is used to obtain the TLOG FBN. The TLOG FBN then provides the PVBN for the data associated with the request. From the TLOG FBN, in block B636, the PVBN of the performance tier 112 is obtained. The read request is then processed by obtaining the data from the performance tier 112 instead.

Figure 6C:
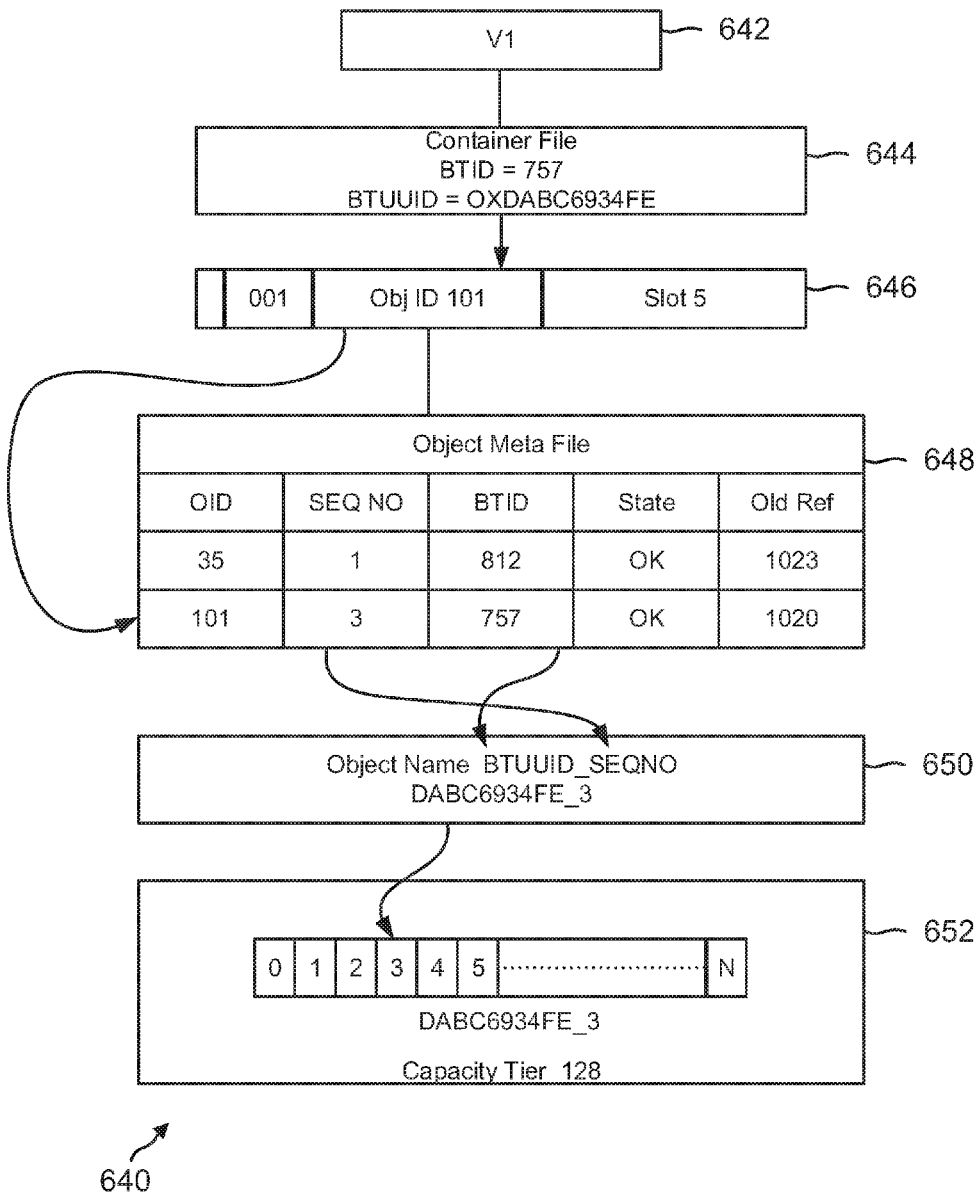
FIG. 6C shows an example of retrieving data from a capacity tier, according to one aspect of the present disclosure.

FIG. 6C shows an example (640) of obtaining the data from the capacity tier 128. The read request provides the volume information V1 in block 642. The container file of the volume is retrieved in block 644. The container file has a BTID of 757 and a unique identifier of 0XDABC6934FE. The container file points to an object PVBN 646 that provides an object ID 101 and slot 5. The object ID is shown in the object metafile 648. The object name is then shown in block 650, which points to the actual object 652 in the capacity tier 128.

In one aspect, the use of TLOG 512 may be used for asynchronous transfers to the capacity tier 128 or to a slower RAID group (not shown) than the performance tier 112. The TLOG 512 enables use of batch groups for transferring data.

The processes described above have various advantages. Incoming cold data is buffered using the TLOG 512. The cold data may reside in the performance tier 112. The transfer of the cold data is executed as part of a CP operation. The TLOG 512 enables efficient addressing and avoids pointer updates in files after the data is moved.

In another aspect, TLOG 512 enables assembly of multiple objects at the same time, for one or more volumes. This again is efficient for a CP write operation. Furthermore, to move data from the performance tier 112, the TLOG 512 points to the PVBN of the performance tier 112 and hence, one does not have to write the data twice at the performance tier 112 or assign a new PVBN.

In yet another aspect, the TLOG 512 may operate as a read-cache for data already in the capacity tier 128, if the TLOG 512 is not purged after the data has been stored at the capacity tier 128. For example, the system may keep one day's worth of data that was stored at the capacity tier 128 at the TLOG 512 and purge the TLOG 512 if it is not accessed.

In yet another aspect, the TLOG 512 may be used as a throttling mechanism to manage flow control. For example, when write operations to the capacity tier 128 are slow, the TLOG 512 will fill up quickly and may be used to provide feedback to throttle the rate at which data is being tiered.

Figure 7:
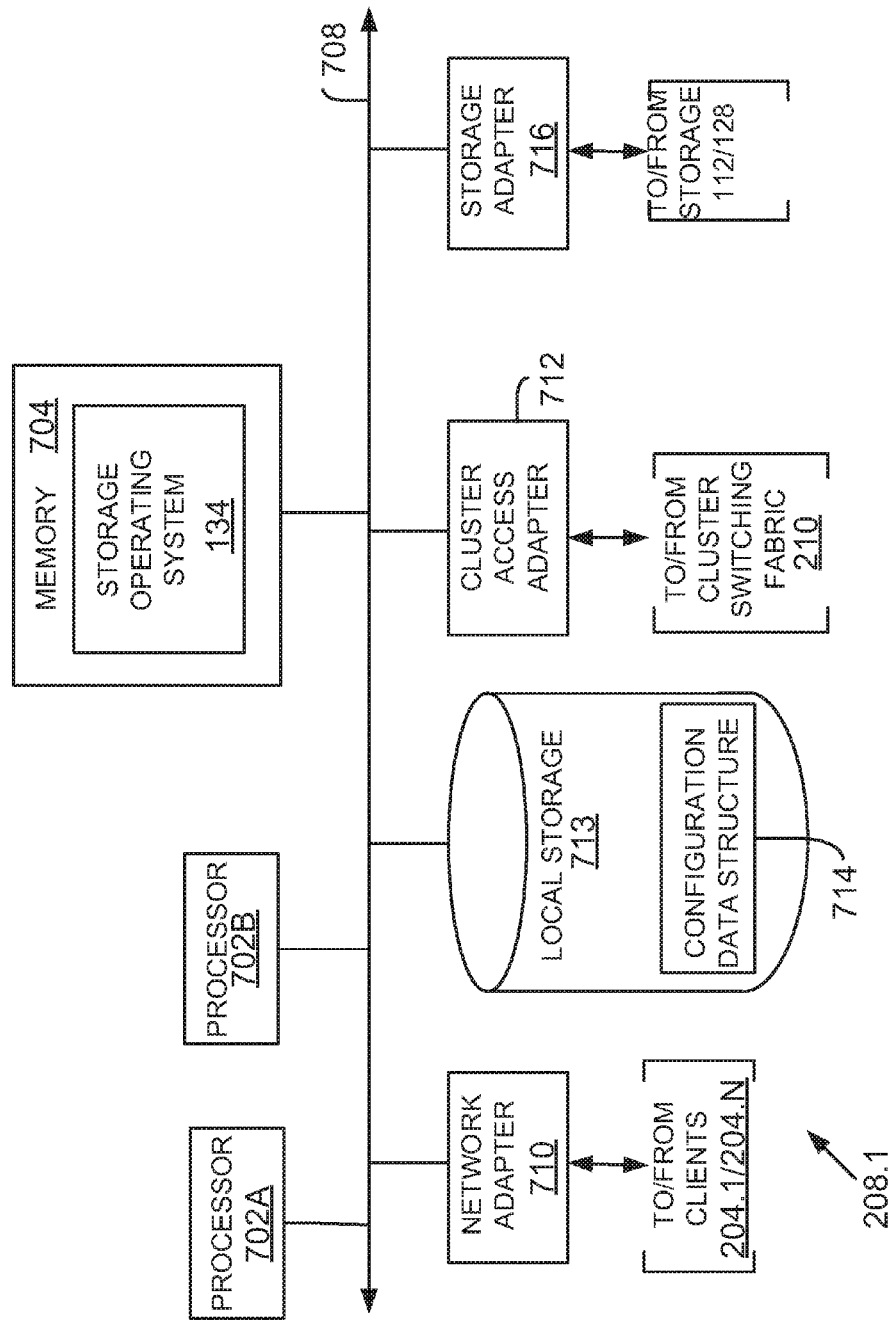
FIG. 7 shows an example of a storage system node, used according to one aspect of the present disclosure.

Storage System Node: FIG. 7 is a block diagram of a node 208.1 that is illustratively embodied as a storage system comprising of a plurality of processors 702A and 702B, a memory 704, a network adapter 710, a cluster access adapter 712, a storage adapter 716 and local storage 713 interconnected by a system bus 708.

Processors 702A-702B may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices.

The local storage 713 comprises one or more storage devices utilized by the node to locally store configuration information for example, in a configuration data structure 714.

The cluster access adapter 712 comprises a plurality of ports adapted to couple node 208.1 to other nodes of cluster 202. In the illustrative aspect, Ethernet may be used as the clustering protocol and interconnect media, although it will be apparent to those skilled in the art that other types of protocols and interconnects may be utilized within the cluster architecture described herein. In alternate aspects where the network modules and storage modules are implemented on separate storage systems or computers, the cluster access adapter 712 is utilized by the network/storage module for communicating with other network/storage-modules in the cluster 202.

Each node 208.1 is illustratively embodied as a dual processor storage system executing the storage operating system 134 that preferably implements a high-level module, such as a file system, to logically organize the information as a hierarchical structure of named directories and files at storage 112/128. However, it will be apparent to those of ordinary skill in the art that the node 208.1 may alternatively comprise a single or more than two processor systems. Illustratively, one processor 702A executes the functions of the network module on the node, while the other processor 702B executes the functions of the storage module.

The memory 704 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions pertaining to the disclosure described herein.

The storage operating system 134 portions of which is typically resident in memory and executed by the processing elements, functionally organizes the node 208.1 by, inter alia, invoking storage operation in support of the storage service implemented by the node.

In one aspect, data that needs to be written is first stored at a buffer location of memory 704. Once the buffer is written, the storage operating system acknowledges the write request. The written data is moved to NVRAM storage and then stored persistently either at the performance tier 112 or the capacity tier 128.

The network adapter 710 comprises a plurality of ports adapted to couple the node 208.1 to one or more clients 204.1/204.N over point-to-point links, wide area networks, virtual private networks implemented over a public network (Internet) or a shared local area network. The network adapter 710 thus may comprise the mechanical, electrical and signaling circuitry needed to connect the node to the network. Each client 204.1/204.N may communicate with the node over network 206 (FIG. 2A) by exchanging discrete frames or packets of data according to pre-defined protocols, such as TCP/IP.

The storage adapter 716 cooperates with the storage operating system 134 executing on the node 208.1 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored at storage device 212.1. The storage adapter 716 comprises a plurality of ports having input/output (I/O) interface circuitry that couples to the storage devices over an I/O interconnect arrangement, such as a conventional high-performance, Fibre Channel link topology.

Figure 8:
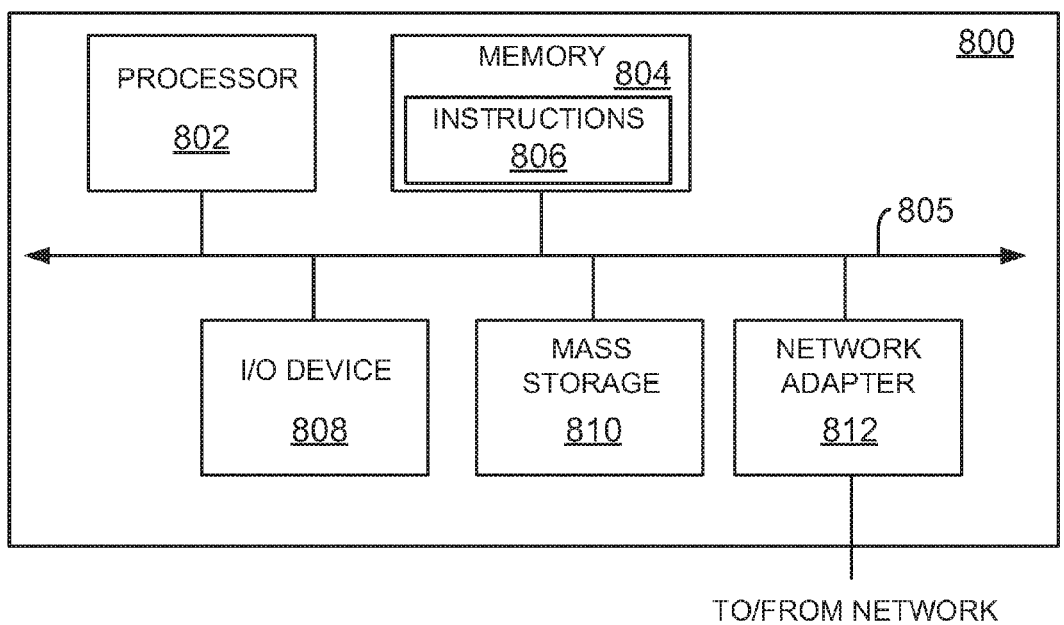
FIG. 8 shows an example of a processing system, used according to one aspect of the present disclosure.

Processing System: FIG. 8 is a high-level block diagram showing an example of the architecture of a processing system 800 that may be used according to one aspect. The processing system 800 can represent host system 102, management console 132, clients 116, 204 or storage system 108. Note that certain standard and well-known components which are not germane to the present aspects are not shown in FIG. 8.

The processing system 800 includes one or more processor(s) 802 and memory 804, coupled to a bus system 805. The bus system 805 shown in FIG. 8 is an abstraction that represents any one or more separate physical buses and/or point-to-point connections, connected by appropriate bridges, adapters and/or controllers. The bus system 805, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor(s) 802 are the central processing units (CPUs) of the processing system 800 and, thus, control its overall operation. In certain aspects, the processors 802 accomplish this by executing software stored in memory 804. A processor 802 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 804 represents any form of random access memory (RAM), read-only memory (ROM), flash memory, or the like, or a combination of such devices. Memory 804 includes the main memory of the processing system 800. Instructions 806 may be used to implement the process steps of FIGS. 5C, 6A and 6B described above, may reside in and execute (by processors 802) from memory 804.

Also connected to the processors 802 through the bus system 805 are one or more internal mass storage devices 810, and a network adapter 812. Internal mass storage devices 810 may be, or may include any conventional medium for storing large volumes of data in a non-volatile manner, such as one or more magnetic or optical based disks. The network adapter 812 provides the processing system 800 with the ability to communicate with remote devices (e.g., storage servers) over a network and may be, for example, an Ethernet adapter, a Fibre Channel adapter, or the like.

The processing system 800 also includes one or more input/output (I/O) devices 808 coupled to the bus system 805. The I/O devices 808 may include, for example, a display device, a keyboard, a mouse, etc.

Cloud Computing: The system and techniques described above are applicable and useful in the upcoming cloud computing environment. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud. After the application layer, is a cloud platform and cloud infrastructure, followed by a "server" layer that includes hardware and computer software designed for cloud specific services, for example, the capacity tier 128 is accessible as a cloud service. Details regarding these layers are not germane to the embodiments disclosed herein.

Thus, a method and apparatus for using performance tier and capacity tier in a networked storage environment have been described. Note that references throughout this specification to "one aspect" (or "embodiment") or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A machine implemented method, comprising:

receiving a request by a processor executing instructions out of a memory for a storage operating system to write a data block stored at a first storage tier to a second storage tier;

using by the processor an object staging data structure to track an object that is in a process of being built to transfer a plurality of data blocks from the first storage tier to the second storage tier, wherein the object staging data structure is used to determine when the object is complete and available for transferring the plurality of data blocks from the first storage tier to the second storage tier;

wherein the object staging data structure stores a unique identifier for the object, an indicator explicitly providing a status of the object indicating when the object is still in the process of being built and when the object is ready for transferring the plurality of data blocks, an object length indicating a length of the object and an offset value of a transfer log that stores physical addresses of the first storage tier where the plurality of data blocks are stored before the plurality of data blocks are transferred to the second tier; and wherein the transfer log is a temporary data structure that uses the object staging data structure to determine when the object is ready for transferring the plurality of data blocks to the second storage tier and the transfer log is used to process a read request that is received before any of the plurality of data blocks are transferred to the second storage tier;

scanning by the processor the object staging data structure to identify that the object is in the process of being built;

updating by the processor the transfer log with an address of the first storage tier where data regarding the data block is stored;

increasing by the processor the object length and the offset value at the object staging data structure for indicating metadata location of the data block within the object and an address for the data of the data block stored at the transfer log;

generating by the processor the object identified by the object staging data structure indicating that the object is ready for transferring the data block; and transferring by the processor the data block and the plurality of data blocks of the object from the first storage tier to the second storage tier.

2. The method of claim 1, wherein when the object is unavailable for the data block, then the processor assigns a new object identifier for a new object and inserts a new entry at the object staging data structure.

3. The method of claim 1, wherein the first storage tier provides faster access to the data block than the second storage tier.

4. The method of claim 1, wherein in response to a read request for data from the second tier, the processor uses the object staging data structure to determine that an object associated with the read request has not yet been created at the second tier.

5. The method of claim 4, wherein the processor retrieves an offset value of the transfer log from the object staging data structure to ascertain an address of the requested data and obtains the address from the transfer log.

6. The method of claim 5, wherein the processor retrieves the requested data using the ascertained address from the first storage tier.

7. The method of claim 4, wherein when the object associated is located at the second storage tier, then the processor retrieves the requested data from the second storage tier.

8. A non-transitory, machine readable medium having stored thereon instructions comprising machine executable code which when executed by a machine, causes the machine to:

receive a request by a processor executing instructions out of a memory for a storage operating system to write a data block stored at a first storage tier to a second storage tier;

use by the processor an object staging data structure to track an object that is in a process of being built to transfer a plurality of data blocks from the first storage tier to the second storage tier, wherein the object staging data structure is used to determine when the object is complete and available for transferring the plurality of data blocks from the first storage tier to the second storage tier;

wherein the object staging data structure stores a unique identifier for the object, an indicator explicitly providing a status of the object indicating when the object is still in the process of being built and when the object is ready for transferring the plurality of data blocks, an object length indicating a length of the object and an offset value of a transfer log that stores physical addresses of the first storage tier where the plurality of data blocks are stored before the plurality of data blocks are transferred to the second tier; and wherein the transfer log is a temporary data structure that uses the object staging data structure to determine when the object is ready for transferring the plurality of data blocks to the second storage tier and the transfer log is used to process a read request that is received before any of the plurality of data blocks are transferred to the second storage tier;

scan by the processor the object staging data structure to identify that the object is in the process of being built;

update by the processor the transfer log with an address of the first storage tier where data regarding the data block is stored;

increase by the processor the object length and the offset value at the object staging data structure for indicating metadata location of the data block within the object and an address for the data of the data block stored at the transfer log;

generate by the processor the object identified by the object staging data structure indicating that the object is ready for transferring the data block; and transfer by the processor the data block and the plurality of data blocks of the object from the first storage tier to the second storage tier.

9. The non-transitory, storage medium of claim 8, wherein when the object is unavailable for the data block, then the processor assigns a new object identifier for a new object and inserts a new entry at the object staging data structure.

10. The non-transitory, storage medium of claim 8, wherein the first storage tier provides faster access to the data block than the second storage tier.

11. The non-transitory, storage medium of claim 8, wherein in response to a read request for data from the second tier, the processor uses the object staging data structure to determine that an object associated with the read request has not yet been created at the second tier.

12. The non-transitory, storage medium of claim 11, wherein the processor retrieves an offset value of the transfer log from the object staging data structure to ascertain an address of the requested data and obtains the address from the transfer log.

13. The non-transitory, storage medium of claim 12, wherein the processor retrieves the requested data using the ascertained address from the first storage tier.

14. The non-transitory, storage medium of claim 11, wherein when the object associated is located at the second storage tier, then the processor retrieves the requested data from the second storage tier.

15. A system, comprising:

a memory containing machine readable medium comprising machine executable code having stored thereon instructions; and a processor module coupled to the memory, the processor module configured to execute the machine executable code to:

receive a request to write a data block stored at a first storage tier to a second storage tier;

use an object staging data structure to track an object that is in a process of being built to transfer a plurality of data blocks from the first storage tier to the second storage tier, wherein the object staging data structure is used to determine when the object is complete and available for transferring the plurality of data blocks from the first storage tier to the second storage tier;

wherein the object staging data structure stores a unique identifier for the object, an indicator explicitly providing a status of the object indicating when the object is still in the process of being built and when the object is ready for transferring the plurality of data blocks, an object length indicating a length of the object and an offset value of a transfer log that stores physical addresses of the first storage tier where for the plurality of data blocks are stored before the plurality of data blocks are transferred to the second tier; and wherein the transfer log is a temporary data structure that uses the object staging data structure to determine when the object is ready for transferring the plurality of data blocks to the second storage tier and the transfer log is used to process a read request that is received before any of the plurality of data blocks are transferred to the second storage tier;

scan the object staging data structure to identify that the object is in the process of being built;

update the transfer log with an address of the first storage tier where data regarding the data block is stored;

increase the object length and the offset value at the object staging data structure for indicating metadata location of the data block within the object and an address for the data of the data block stored at the transfer log;

generate the object identified by the object staging data structure indicating that the object is ready for transferring the data block; and transfer the data block and the plurality of data blocks of the object from the first storage tier to the second storage tier.

16. The system of claim 15, wherein when the object is unavailable for the data block, then the processor assigns a new object identifier for a new object and inserts a new entry at the object staging data structure.

17. The system of claim 15, wherein in response to a read request for data from the second tier, the processor uses the object staging data structure to determine that an object associated with the read request has not yet been created at the second tier.

18. The system of claim 17, wherein the processor retrieves an offset value of the transfer log from the object staging data structure to ascertain an address of the requested data and obtains the address from the transfer log.

19. The system of claim 18, wherein the processor retrieves the requested data using the ascertained address from the first storage tier.

20. The system of claim 17, wherein when the object associated is located at the second storage tier, then the processor retrieves the requested data from the second storage tier.

* * * * *